United States Patent [19]

Kruse et al.

[11] Patent Number: 5,194,475

[45] Date of Patent: * Mar. 16, 1993

[54] ROOM TEMPERATURE JET PRINTING INK AND METHOD

[75] Inventors: Jurgen M. Kruse, Clinton; Donald B. Kimball, Jr., Guilford, both of Conn.

[73] Assignee: Xaar Limited, England

[*] Notice: The portion of the term of this patent subsequent to Apr. 23, 2008 has been disclaimed.

[21] Appl. No.: 605,560

[22] Filed: Oct. 29, 1990

Related U.S. Application Data

[63] Continuation-in-part of Ser. No. 379,595, Jul. 14, 1989, abandoned.

[30] Foreign Application Priority Data

Jul. 11, 1990 [EP] European Pat. Off. ............ 90307571
Jul. 13, 1990 [JP] Japan .................... 2-184399

[51] Int. Cl.$^5$ ................................................ C08K 5/10
[52] U.S. Cl. .................... 524/308; 524/376; 524/563
[58] Field of Search .......... 106/22, 23; 523/160; 524/308

[56] References Cited

U.S. PATENT DOCUMENTS

| 4,070,322 | 1/1978 | Hwang et al. | 260/29.6 R |
|---|---|---|---|
| 4,338,133 | 7/1982 | Toyoda et al. | 106/22 |
| 4,361,843 | 11/1982 | Cooke et al. | 346/1.1 |
| 4,386,961 | 6/1983 | Lin | 106/22 |
| 4,390,369 | 6/1983 | Merritt et al. | 106/31 |
| 4,465,800 | 8/1984 | Bhatia | 524/236 |
| 4,490,177 | 12/1984 | Shioi et al. | 106/23 |
| 4,655,834 | 4/1987 | Haruta et al. | 106/20 |
| 4,692,188 | 9/1987 | Ober et al. | 106/23 |
| 4,791,165 | 12/1988 | Bears et al. | 524/516 |
| 4,834,799 | 5/1989 | Song | 106/22 |
| 4,849,773 | 7/1989 | Owatari | 106/22 |
| 5,010,125 | 4/1991 | Kruse et al. | 524/308 |

FOREIGN PATENT DOCUMENTS

| 62444 | 10/1982 | European Pat. Off. |
|---|---|---|
| 71345 | 2/1983 | European Pat. Off. |
| 99682 | 2/1984 | European Pat. Off. |
| 176228 | 4/1986 | European Pat. Off. |
| 181198 | 5/1986 | European Pat. Off. |
| 187352 | 7/1986 | European Pat. Off. |
| 206286 | 12/1986 | European Pat. Off. |
| 3203782A1 | 1/1983 | Fed. Rep. of Germany |
| 3203782 | 8/1983 | Fed. Rep. of Germany |

Primary Examiner—William R. Dixon, Jr.
Assistant Examiner—Margaret Einsmann
Attorney, Agent, or Firm—Marshall, O'Toole, Gerstein, Murray & Bicknell

[57] ABSTRACT

An ink jet composition and method of printing on plain paper are provided wherein the composition comprises a colloidal solution of a nonaqueous solvent (e.g. selected glycol ethers) and a disperse phase comprising a resin (e.g. a selected ethylene-vinyl acetate copolymer) which is soluble in the solvent at room temperature and a dyestuff which is soluble in the resin at room temperature but substantially insoluble in the solvent at room temperature. The ink composition is fluid and may have a very low viscosity at room temperature.

36 Claims, No Drawings

ROOM TEMPERATURE JET PRINTING INK AND METHOD

CROSS-REFERENCE TO RELATED APPLICATION

This is a continuation-in-part of copending, commonly assigned application Ser. No. 07/379,595 filed Jul. 14, 1989 now abandoned.

BACKGROUND OF THE INVENTION

1. Field of the Invention

This invention relates generally to ink compositions and, more particularly, this invention relates to ink compositions useful in jet printing applications with plain paper, and methods of ink jet printing on plain paper.

2. Description of Related Art

Printing according to the "ink jet printing" principle, and apparatus for carrying out such printing operations, are well known. In general terms, a fluid ink is forced, under pressure and often at an elevated temperature, through a very small orifice in a printing head.

In so-called "continuous" jet printing operations, ink droplets are passed through a charging area wherein individual droplets receive an electrical charge in response to a signal. The droplets then pass through an electrical field, causing a varied deflection of the individual droplets dependent on the intensity of the charge and field. The droplets are produced continuously, and are directed to the substrate to be printed or, alternatively, to a by-pass gutter.

Due to the nature of the "continuous" jet printing process, inks used therein must be conductive so as to accept a charge. Such inks are generally water-based, as aqueous solutions or dispersions are easily rendered conductive. Water-based inks are generally characterized as having a low viscosity and high volatility. Both characteristics can be disadvantageous.

If the viscosity of a jet printing ink is excessively low, misting and the production of stray droplets can result, which in turn result in poor print quality. High volatility of a jet printing ink can result in clogging of jet nozzles due to evaporation.

Also, only a few water-based inks are capable of use on plain paper (i.e. a paper not bearing a pigment coating) and are capable of providing a high dye concentration on the surface of the paper so that it is possible to produce fine-sized droplets and to avoid build-up of dyestuff on the substrate surface while providing high color intensity.

So-called "drop on demand" (DOD) systems differ from continuous jet printing systems in that ink droplets are expelled from the nozzle of a printing head only when required during the printing process.

In a DOD printing system, ink is provided from a reservoir via a supply system to a nozzle/actuator system in the printing head. The actuators are generally of the piezoelectric or bubble type which upon actuation deliver a pressure pulse to the ink and thereby to force a very small and defined volume of the ink from a chamber defined by the actuator through a jet nozzle associated therewith from which the volume is ejected as a droplet.

For use in a DOD printing system, it is important for the ink to have a relatively low viscosity so as to minimise the power required to eject the droplets. It is also important that the size of any particles in the inks be sufficiently small to minimise the risk of blockage in the ink passageways of the nozzle/actuator system.

On the other hand, however, where the ink is intended for printing on a fibrous substrate such as paper, the deposits of colorant provided on the substrate by each droplet must be sufficiently large not to fall through the gaps between the fibres in the surface structure of the substrate.

Since inks used in DOD systems need not be conductive, they have generally been formulated using primarily non-aqueous solvents such as ethylene glycols, particularly diethylene glycols, which are characterized as having low volatility. As such, ethylene glycol and similar solvent-based inks do not evaporate quickly and, thus, exhibit reduced clogging problems.

Moreover, solvent-based inks exhibit desirable drying characteristics and are biologically stable while water-based inks generally tend to sorb air from the environment and are susceptible to biological fouling.

However, ethylene glycol and other non-aqueous solvents have a relatively high viscosity (which varies significantly with temperature) and thus require relatively more energy for production of droplets.

In some cases, it may be desirable to use a non-conductive ink (or one having extremely low conductivity) in DOD printers. For example, in DOD actuators wherein piezoelectric electrodes are disposed within an ink-containing chamber, the ink is preferably non-conductive in order to minimize or eliminate electrochemical effects.

Another class of inks used in jet printing are referred to in the art as "hot melt" inks and comprise wax or other thermoplastic materials such that the ink is solid or semisolid at ambient temperatures but fluid at elevated temperatures. The heated ink fluid solidifies when it comes in contact with a paper target.

Such inks generally tend to exhibit excellent dye stability, lightfastness, and no solvent volatility. However, these inks accommodate only relatively low dye concentration and therefore necessitate the production of relatively large drops in order to provide acceptable color intensity. Also, the thermoplastic component of such inks tends to form raised waxy deposits which are easily smeared or scratched off by rubbing.

Hot melt jet inks tend to be highly viscous and thus require high energy input in order to eject the drop from the printer nozzle. Also, since the entire ink must be rendered fluid by heating, high energy inputs and lengthy time periods are required to reach the printer operating temperature.

SUMMARY OF THE INVENTION

It is an object of the invention to overcome one or more of the problems described above.

According to the present invention, a jet printing ink composition is provided which comprises a colloidal solution of a non-aqueous solvent and a disperse phase. The disperse phase comprises a resin, in an amount which is capable of forming a solution in said solvent at room temperature, and a dyestuff which is soluble in the resin at room temperature but substantially insoluble in the solvent at room temperature. The ink is fluid and may have a low viscosity at room temperature. Upon ejection from the printer on to a paper substrate, the disperse phase (which carries the dyestuff) precipitates or gels on the substrate surface as the solvent is absorbed into the substrate.

The ink composition of the invention is useful on a wide variety of plain papers, facilitates the production of fine dots without the production of easily smudged raised deposits, facilitates mixing of colors, provides high color intensity, and is economical in that it may be used at room temperature.

A method of ink jet printing on plain paper using the inventive ink composition is also provided.

Other objects and advantages of the invention will be apparent to those skilled in the art from a review of the following detailed description taken in conjunction with the appended claims.

DETAILED DESCRIPTION OF THE INVENTION

The inventive jet ink composition exhibits many of the advantages of prior solvent-based, water-based, and hot melt jet printing inks while eliminating important disadvantages associated with each of these types of inks. The inventive ink exhibits excellent dye stability, water fastness, low solvent volatility, and lightfastness associated with prior hot melt inks, yet exhibits desirable drying characteristics and excellent biological stability such as exhibited by prior solvent-based inks.

Similar to many water-based inks, the inventive ink composition is compatible with plain paper (i.e. paper which is free of a pigment coating) and is capable of providing a high dye concentration on the surface of a paper target, with very sharp edged ink deposits and rapid drying.

The inventive jet ink composition comprises a colloidal solution of a non-aqueous solvent and a disperse phase comprising a resin in an amount which is capable of forming a solution in the solvent at room temperature and a dyestuff which is soluble in the resin at room temperature but substantially insoluble in the solvent at room temperature. The respective proportions of the solvent, resin, and dyestuff are selected to provide a fluid ink composition at room temperature.

As used herein, the term "colloidal solution" denotes a system wherein very small particles are substantially uniformly dispersed in the liquid ("solvent") medium. The dispersed particles (which in this case comprise the resin and the dyestuff) are typically small enough to pass through a filter membrane having 0.5 $\mu$m openings.

As such, the resin is contained in the solvent in a highly solvated form, but generally comprises multimolecular particles, as opposed to unimolecular species of a true solution.

When the ink contacts a paper surface, the disperse phase settles on the surface with the resin binding the dyestuff to the cellulose of the paper. This maximizes the effective color, while the solvent is absorbed by the paper. Since the dyestuff is insoluble in the solvent, the dyestuff is not absorbed into the paper or wicked laterally on to the paper, and because it is bound to the surface of the paper by the resin, it remains on the surface of the paper even where the particle size is small relative to the gaps between the fibers in the paper surface.

If necessary, to maintain the resin and dyestuff in stable suspension, an effective amount of a suspending agent may be present in the ink composition.

The Solvent

The solvent is selected to form a low viscosity colloidal solution with the resin and dyestuff at room temperature (i.e. about 20°-30° C. generally about 25°-30° C.) but to allow the disperse phase of resin and dyestuff to precipitate or gel on a paper substrate surface when the ink comes into contact with said surface. The solvent must be rapidly absorbed (i.e. wicked) into the paper substrate. The solvent should have a relatively high boiling point to prevent evaporation and consequent deposition of solids in the jet printing nozzle, which can result in clogging.

The selection of the solvent is made in conjunction with the selection of resin and dyestuff. As described in detail below, certain ethylene-vinyl acetate (EVA) copolymers are highly preferred as the resins. For such resins, alcohols and polyols such as ethylene glycol and diethylene glycol are not suitable since EVA is insoluble therein.

For use with the preferred EVA resins, useful solvents include generally one or more propylene glycol ethers or ethylene glycol butyl ethers in which the solubility requirements of the resin and dyestuff as described herein are satisfied.

Such solvents include dipropylene glycol ethers, tripropylene glycol ethers, ethylene glycol butyl ethers, diethylene glycol butyl ethers and triethylene glycol butyl ethers. Propylene glycol alkyl ethers such as dipropylene glycol monomethyl ether and tripropylene glycol monomethyl ether are preferred, with tripropylene glycol monomethyl ether being highly preferred.

Glycol ethers such as dipropylene glycol monomethyl ether (boiling point 188° C.) and tripropylene glycol monomethyl ether (boiling point 242° C.) perform very well and exhibit cloud points using typical concentrations of a preferred ethylene-vinyl acetate resin of less than 20°C. These cloud points are substantially below ambient temperatures, ensuring that the EVA resin will be substantially soluble in such solvents at ambient conditions.

Solvents which are suitable for use according to the invention are available commercially from several suppliers, including Dow Chemical U.S.A. of Midland, Mich. under the trade designation "Dowanol." Tripropylene glycol monomethyl ether is designated "Dowanol TPM." Dipropylene glycol monomethyl ether is available under the designation "Dowanol DPM." Ethylene glycol n-butyl ether is sold under the designation "Dowanol EB", and diethylene glycol n-butyl ether is designated "Dowanol DB." Triethylene glycol n-butyl ether is available as "Dowanol TBH."

For use with EVA resins, solvents such as dimethylformamide or tetrahydrofuran are not acceptable since the dyestuff tends to be more soluble in the solvent than in the resin and thus is sorbed into the paper with the solvent. This sorption results in lateral dot wicking and lower optical density.

The Resin

For use in the invention, one or more resins which are capable of forming a solution in the solvent at room temperature (e.g. 25°-30° C.) are selected. By "capable of forming a solution", it is meant that in the amount in which the resin is employed it will dissolve in the solvent or at least is so highly solvated by the solvent that the product is substantially indistinguishable from a true solution. The resin preferably will adhere well to the paper substrate, should be optically clear, and should hold the selected dyestuff on the paper surface at ambient conditions.

Rapid dissolution is facilitated by the use of low melting point resins.

Ethylene-vinyl acetate copolymer resins are highly preferred for use in the invention. EVA resins, especially those having relatively high vinyl acetate contents of greater than 40 wt %. preferably greater than 45 wt. % and highly preferably about 50 wt. % or more, adhere extremely well to cellulosic substrates and have softening points which can be varied from just about ambient temperature to higher temperatures by varying the vinyl acetate content. A useful EVA resin has a vinyl acetate content of about 50 wt. % and is sold by Quantum Chemical Corporation, USI Division under the trade designation Vynathene 90500. Vynathene 90230 sold by Quantum (USI) is also suitable.

The Dyestuff

The dyestuff (which may include certain pigments) is selected to be soluble in the resin at room temperature and above but substantially insoluble in the solvent at room temperature. By the dyestuff being soluble in the resin and substantially insoluble in the solvent, it is meant that in the colloidal solution the dyestuff is substantially entirely associated with the resin phase, e.g. by being dissolved in the resin or bound to it such as by hydrogen bonds or Van der Waal's forces, and substantially no dyestuff is associated with the solvent phase; whereby when a drop of the ink is deposited on a substrate such as of paper, the dyestuff essentially remains with the resin on the surface of the paper and substantially none of the dyestuff is absorbed into the paper with the solvent phase. A wide variety of dyestuffs are useful and many of those characterized as "pigment dyes" in The Colour Index are satisfactory. Since the dyestuff is soluble in the resin, mixing of hues on the paper surface is facilitated. The dyestuff is preferably of a primary substractive hue. The dyestuff should be lightfast, and thermally stable even with repeated warming. The dyestuff should be water insoluble once applied to the substrate to prevent smearing upon contact with water containing substances.

Dyes which have been found to be useful include Pigment Green 7, Direct Blue 15, Pigment Yellow 17, Pigment Yellow 12, and the Ciba Geigy Microlith Series which includes Black, Red, Blue, Green and Gold. Pigment Blue 15 is a preferred dyestuff.

Other useful dyes include Cyan Blue BNF, Imperial Sacandaga Yellow and Lithol Rubine. These dyes are especially suitable in combination with Vynathene EVA resins and TPM solvents.

Additionally, certain carbon blacks are useful as pigments in the invention. Preferred carbon blacks are Continex N234 or N330 carbon black from Witco Chemical Corp. and Regal 660R carbon black from Cabot Corp.

The Suspending Agent

For many dyes (with exceptions, such as Witco Continex N234 carbon black) it is necessary to add a suspending agent to the ink to keep the disperse phase from settling out of the colloidal solution or coagulating, especially when stagnant. For ink systems wherein ink conductivity is permissible, anionic surfactants (e.g. sodium lauryl sulfonate) can be used to prevent the suspended sol particles from agglomerating and settling. If low solution conductivity is required, a different type of dispersant is required. Glycerol monostearate, glycerol monolaurate and similar monoesters of glycerol work well in such systems. The related di and triesters of glycerol, i.e. glycerol distearate or glycerol tristearate, are not effective, and in fact are counterproductive in that they cause settling and form precipitates that float on the ink solution. The concentration of the glycerol monoester should be between about 0.05 and about 0.25 wt. %, with a preferred upper limit of about 0.20 wt. %.

Proportions of Ingredients and Physical Characteristics of the Composition

According to the invention, the proportions of the solvent, resin and dye are selected to provide an ink composition which is fluid and preferably has a very low viscosity at room temperature.

Although the ink composition is fluid at room temperature, preferred ink compositions (e.g. comprising 5 wt % Vynathene 90500 EVA in TPM) exhibit non-Newtonian behavior at ambient conditions. This is advantageous in that the ink composition behaves as a gel during storage at ambient conditions, but will flow when shear force is applied.

The preferred ink composition will typically exhibit a low viscosity (i.e. in the range of 10–40 cps) at ambient conditions, and usually be non-Newtonian in behavior.

Preferably, the viscosity of the ink at room temperature will be in the range of 10–30 cps, typically 25 cps or lower.

The ink is characterized by high dye absorptivity, resulting in high color intensity, and thus allows the use of relatively low dye concentrations.

Although the respective proportions of dyestuff, resin, and solvent are widely variable and may be empirically selected by the user depending upon the intended purpose, it is preferred that the resin comprise about 7 wt. % or less to the ink composition, highly preferably in the range of 4–7%. with the total of dye and resin being about 10 wt. % or less of the composition.

The weight proportion of resin to dye is preferably low, such as up to about 3:2 or slightly more. This prevents a build-up of resin on the target surface, allows ready mixing of hues, and provides extremely good color intensity. At the same time, the advantages associated with deposition of the resin and dye on the paper surface are retained.

Preferably, the precipitate or gel deposited on the paper surface after absorption of solvent into the paper will comprise about 25–65 wt. % dye.

With reference to a preferred Vynathene 90500 EVA resin/TPM solvent system, a preferred composition is 4 to 6 wt. % Vynathene 90500 EVA resin and a dye to resin ratio (W/W) of up to a maximum of about 3:4. preferably 2:3 or 1:2. Thus, a dye concentration of 3 wt. % in the ink composition is highly preferred. Higher Vynathene 90500 resin levels are disadvantageous in that they result in higher viscosities.

The choice of proportions will depend on the viscosity requirements of the ink jet apparatus and the required dye characteristics.

One preferred method of preparing the ink is by grinding the dyestuff (e.g. carbon black) and the resin together in the presence of as small an amount of solvent as possible to disperse the materials, minimise the degree of solvation of the resin and promote the solution of the dyestuff in the resin or the binding of the dyestuff to the resin, followed by addition of more solvent to the desired concentration level. The use of this technique facilitates the combining of resin with the dyestuff and prevents settling of the dyestuff from the ink on standing. In an alternative method, the chosen resin is dissolved in hot solvent, the dyestuff added to the solution so obtained and the mixture then cooled rapidly.

According to the invention, ink jet printing on plain paper may be effected by jetting the jet ink composition against a surface of a cellulosic substrate whereby the solvent in the ink composition is absorbed into the substrate thus increasing the resin concentration in the residual compositions and causing the resin together with the dye to precipitate or gel on the surface to form print.

The cellulosic substrate surface is preferably plain paper, i.e. paper which is substantially free of a pigment (e.g. silica) coating. Clay or silica fillers are acceptable but not required. Non-pigment coating such as surface sizing, starch, etc are acceptable.

The temperature at which the ink is jetted can be relatively low, and may be room temperature.

The inventive ink is tacky at room temperature, and adherence to the paper surface is excellent.

The foregoing detailed description is given for clearness of understanding only, and no unnecessary limitations should be understood therefrom, as modification within the scope of the invention will be obvious to those skilled in the art.

We claim:

1. An ink jet ink composition comprising a colloidal solution of:
   (a) a non-aqueous solvent; and
   (b) a disperse phase comprising a resin which is soluble in said solvent at room temperature and a dyestuff which is soluble in said resin at room temperature but substantially insoluble in said solvent at room temperature, said disperse phase being in the form of colloidal size particles and the proportions of said solvent, resin, and dyestuff being selected to provide a fluid ink composition at room temperature.

2. The ink composition of claim 1 further comprising a suspending agent in an effective amount to maintain said disperse phase in suspension at room temperature.

3. The ink composition of claim 2 wherein said suspending agent is a monoester of glycerol.

4. The ink composition of claim 3 wherein said suspending agent is selected from the group consisting of glycerol monostearate and glycerol monolaurate.

5. The ink composition of claim 3 wherein the concentration of said suspending agent in said ink is no greater than about 0.25 wt. %.

6. The ink composition of claim 5 wherein said suspending agent concentration is about 0.05 to about 0.20 wt. %.

7. The ink composition of claim 1 wherein said solvent is selected from the group consisting of propylene glycol ethers and ethylene glycol butyl ethers.

8. The ink composition of claim 7 wherein said solvent is selected from the group consisting of dipropylene glycol ethers and tripropylene glycol ethers.

9. The ink composition of claim 8 wherein said solvent is selected from the group consisting of dipropylene glycol monomethyl ether and tripropylene glycol monomethyl ether.

10. The ink composition of claim 7 wherein said resin is an ethylene-vinyl acetate copolymer.

11. The ink composition of claim 10 wherein said ethylene-vinyl acetate copolymer comprises greater than about 40 wt. % vinyl acetate.

12. The ink composition of claim 11 wherein said ethylene-vinyl acetate copolymer comprises at least about 50 wt. % vinyl acetate.

13. The ink composition of claim 10 wherein said dyestuff is a pigment dye.

14. The ink composition of claim 10 wherein said solvent is tripropylene glycol monomethyl ether and the weight ratio of said dyestuff to said resin is about 3:4 or below.

15. The ink composition of claim 10 wherein said resin comprises about 7 wt. % or less of said composition.

16. The ink composition of claim 15 wherein said resin comprises about 4 to 7 wt. % of said composition.

17. The ink composition of claim 15 wherein the weight of said resin and said dye total about 10 wt. % or less of said composition.

18. The ink composition of claim 15 wherein the proportions of said solvent, said resin, and said dyestuff are selected to provide a composition viscosity of less than about 40 cps at room temperature.

19. In a method of ink jet printing on plain paper comprising the steps of:
   (a) providing a cellulosic substrate defining a surface substantially free of a pigment coating;
   (b) providing an ink jet ink composition; and
   (c) jetting said ink jet ink composition against said substrate surface, the improvement wherein said ink jet ink composition comprises a colloidal solution of
   (1) a non-aqueous solvent; and
   (2) a disperse phase comprising a resin which is soluble in said solvent at room temperature and a dyestuff which is soluble in said resin at room temperature but substantially insoluble in said solvent at room temperature, said disperse phase being in the form of colloidal size particles and the proportions of said solvent, resin, and dyestuff being selected to provide a fluid ink composition at room temperature; and,
   whereby when said ink jet ink composition is jetted against said substrate surface, said solvent is absorbed into said substrate and said resin and dyestuff in said ink composition precipitate or gel on said surface to form print.

20. The improvement of claim 19 further including a suspending agent in an effective amount to maintain said disperse phase in suspension.

21. The improvement of claim 20 wherein said suspending agent is a monoester of glycerol.

22. The improvement of claim 21 wherein said suspending agent is selected from the group consisting of glycerol monostearate and glycerol monolaurate.

23. The improvement of claim 20 wherein the concentration of said suspending agent in said ink is no greater than about 0.25 wt. %.

24. The improvement of claim 23 wherein said suspending agent concentration is about 0.05 to about 0.20 wt. %.

25. The improvement of claim 19 wherein said solvent is selected from the group consisting of propylene glycol ethers and ethylene glycol butyl ethers.

26. The improvement of claim 25 wherein said solvent is selected from the group consisting of dipropylene glycol ethers and tripropylene glycol ethers.

27. The improvement of claim 26 wherein said solvent is selected from the group consisting of dipropylene glycol monomethyl ether and tripropylene glycol monomethyl ether.

28. The improvement of claim 25 wherein said resin is an ethylene-vinyl acetate copolymer.

29. The improvement of claim 28 wherein said ethylene-vinyl acetate copolymer comprises greater than about 40 wt. % vinyl acetate.

30. The improvement of claim 29 wherein said ethylene-vinyl acetate copolymer comprises at least about 50 wt. % vinyl acetate.

31. The improvement of claim 28 wherein said dyestuff is a pigment dye.

32. The improvement of claim 28 wherein said solvent is tripropylene glycol monomethyl ether and the weight ratio of said dyestuff to said resin is about 3:4 or below.

33. The improvement of claim 28 wherein said resin comprises about 7 wt. % or less of said ink composition.

34. The improvement of claim 33 wherein said resin comprises about 4 to 7 wt. % of said ink composition.

35. The improvement of claim 33 wherein the weight of said resin and said dye total about 10 wt. % or less of said ink composition.

36. The improvement of claim 33 wherein the proportions of said solvent, said resin, and said dyestuff are selected to provide a composition viscosity of less than about 40 cps at room temperature.

* * * * *